Jan. 1, 1924.

E. O SCHWEITZER ET AL

1,479,558

FUSED CUT-OUT

Filed Oct. 1, 1919

Jan. 1, 1924. 1,479,558
E. O. SCHWEITZER ET AL
FUSED CUT-OUT
Filed Oct. 1, 1919 5 Sheets-Sheet 3

Witnesses:
W. F. Kilroy
Harry R. Lewhite

Inventors:
Edmund O. Schweitzer
Alfred Herz
By Brown Bowers and
Dienner Attys.

Jan. 1, 1924 1,479,558
E. O. SCHWEITZER ET AL
FUSED CUT-OUT
Filed Oct. 1, 1919 5 Sheets-Sheet 5

Witnesses:
W. F. Kilroy
Harry R. Levitte

Inventors
Edmund O. Schweitzer
Alfred Herz
By Brown, Boettcher & Dienner
Attys.

Patented Jan. 1, 1924.

1,479,558

UNITED STATES PATENT OFFICE.

EDMUND O. SCHWEITZER AND ALFRED HERZ, OF CHICAGO, ILLINOIS.

FUSED CUT-OUT.

Application filed October 1, 1919. Serial No. 327,659.

*To all whom it may concern:*

Be it known that we, EDMUND O. SCHWEITZER and ALFRED HERZ, citizens of the United States, residing at Chicago, in the county of Cook and State of Illinois, have invented a certain new and useful Improvement in Fused Cut-Outs, of which the following is a full, clear, concise, and exact description, reference being had to the accompanying drawings, forming a part of this specification.

This invention relates to electrical circuit breaking apparatus of the type generally designated as cut-outs, and is further characterized by the use of a fusible link for opening the circuit under overload.

Heretofore it has been customary to construct fused cutouts of an inverted cup or socket member and a plug member which fits up within the socket or cup member, this plug member carrying the fusible link and being insertable into and separable from the contacts carried by the sockets.

In improving upon the simple form of cutouts known prior to our entry into the field, we found that the use of compression blocks on the sides of the fusible link greatly increased the efficiency and positiveness of operation of the fusible link, this particular feature being shown in our prior Patent Number 1,144,732. We also discovered that the submergence of the compression blocks and the fuse in oil greatly increased the range of operativeness and usefulness of such a device, this feature being shown in our prior Patent Number 1,222,952.

We have found, however, that in our previous embodiment of this essential idea, that the use of a closed container capable of withstanding a very considerable pressure is necessary. This feature of the closed container is shown in the co-pending application of Alfred Herz, Serial Number 185,597, filed Aug. 10, 1917, now Patent No. 1,380,556, granted June 7, 1921. The present invention aims more specifically to provide a simple and efficient construction whereby the use of the compression blocks for the fusible link submerged in oil and held in a tight container may be employed to the best advantage.

In our previous embodiments, it has generally been found necessary to employ a plug member bearing contacts which fitted within a socket member, this socket member being open toward the top and being adapted either to contain or to be submerged in the oil employed for confining the compression blocks. This has resulted in a difficulty not previously encountered in the older inverted form in that the insertion of the plug in a downward direction into the oil would be accompanied by unpleasant effects in case the line were still short circuited. This difficulty was due inherently to the fact that it was impossible to place the cover in position until after the fuse had been connected across the terminals of the cutout. If the line were still under short circuit the fuse would blow immediately upon being inserted before the operator could place the cover on the receptacle or socket.

Our present device permits the fusible link to be put in place but not connected across the line while the cover is being secured. After the cover is then in place it is possible to connect the fusible link to the line so that if the line is still short circuited the explosion of the fuse will occur within the closed container or casing without any danger of injury to the operator.

Another improvement which we have made is in the construction of the compression blocks themselves. We have previously employed limestone as the facing for the compression blocks and have found that they are satisfactory in insulating and heat resisting properties but limestone blocks are often shattered by the violence of the explosion of the fuse. We have previously tried asbestos but it is not suitable. It seems to have water of crystallization which spoils its insulating properties and the arc of the fuse tends to make the asbestos more or less of a conductor and seems to fuse the same. We have made numerous experiments with many materials and have at last discovered a substance, namely a composition board made of asbestos and cement, which when boiled in transformer oil, provides a highly satisfactory material for the compression blocks. It seems to us that the boiling in oil removes some or all of the water of crystallization and removes some of the objectionable chemicals which are contained in the asbestos. We are not able to say definitely just what is actually accomplished but we are able to say that the material when so treated performs its function of extinguishing the arc very satisfactorily.

Incidentally we have made a number of improvements in the mechanical construction of the device which will be apparent from the following detailed description. These relate in general to the formation of the contact in that butt contacts are employed in our device for the first time in a cutout of this character. We have further provided an improved cover and mounting bracket which simplifies construction and facilitates operation, and we have improved the mounting for the compression blocks and the spring means for holding the compression blocks against each other and for holding the contacts in place.

In order to acquaint those skilled in the art with the manner of constructing and employing our invention, we shall now describe in connection with the accompanying drawings a particular embodiment of the invention in such terms as will enable one skilled in the art to make and use the same.

Figures 1, 2, 3:
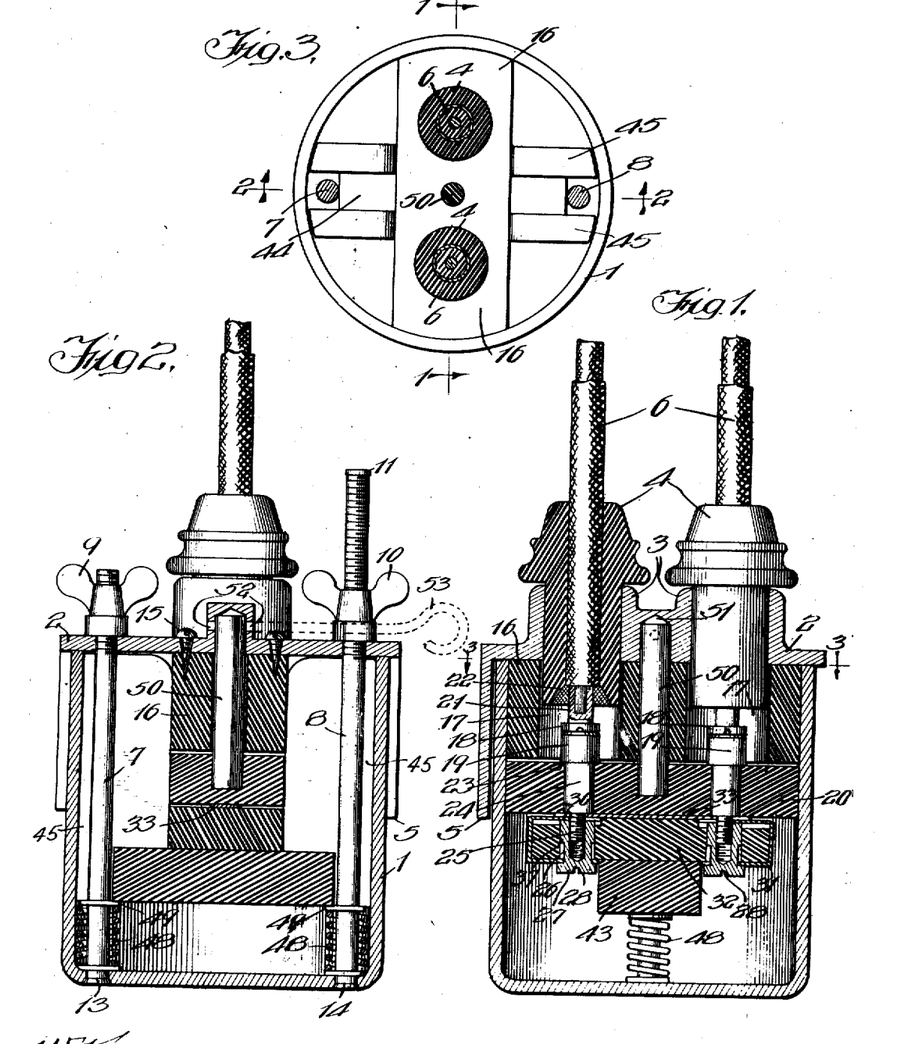
Figure 1 is a vertical sectional view taken on the line 1—1 of Figure 3.
Figure 2 is a similar section taken at right angles on the line 2—2 of Figure 3.
Figure 3 is a horizontal section taken on the line 3—3 of Figure 1.

The container for our cutout comprises a tank 1 and the cover 2. The tank is preferably made of soft steel welded together to form a container of great strength and light weight. This may be accomplished in any well known manner, or may be formed by taking a piece of commercial tubing and welding a plate to the bottom thereof. The cover 2, as shown in Figures 1 and 2, may consist of a casting having the bosses 3 cast therein to receive the insulators 4 which are cemented therein. At the rear side a suitable supporting bracket 5 is formed integral with the cover 2, this bracket being provided with suitable holes or lugs or other suitable means for attaching to a cross arm or any supporting surface. The insulators 4 are preferably cemented into the bosses 3 and insulated conductors 6 are led thru the insulators 4 to the interior of the tank 1, these conductors being sealed in place by suitable cement or compound. The tank 1 and cover 2 are clamped together by means of two bolts or rods 7 and 8. The upper ends of the rods are screw threaded and passed thru the top plate 2, being engaged by suitable wing nuts 9 and 10 or other clamping devices for holding the tank and cover in position. We have shown but two of these bolts, but it is to be understood that more than two may be provided. One of the bolts, in this case bolt 8, is made longer than the other and is provided with a knob or enlargement 11 at its upper end so that the wing nut 10 cannot be removed from the end of the bolt. The long threaded portion permits the tank to be dropped far enough so that it may be swung about bolt 8 into the position shown in Figure 15, where the interior of the tank is exposed to view without mechanically disconnecting the tank from the cover.

At their lower ends the bolts 7 and 8 are welded to or thru the bottom of the tank 1 as indicated at 13 and 14.

Figure 4:
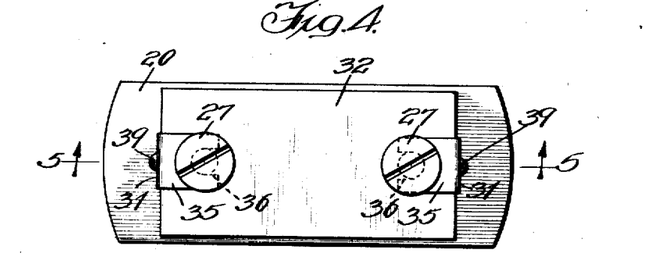
Figure 4 is a bottom plan view of the compression block and fuse with the contacts for the same.
Figures 5, 6, 21:
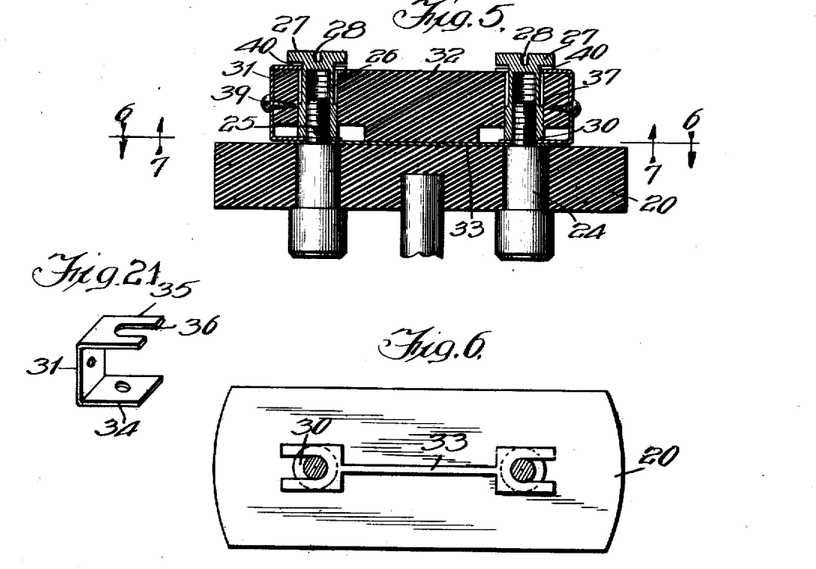
Figure 5 is a longitudinal section thru the same, taken on the line 5—5 of Figure 4.
Figure 6 is a sectional view of the upper block and the fusible link as taken on the line 6—6 of Figure 5.
Figure 21 is a perspective view of one of the conducting straps.
Figure 7:
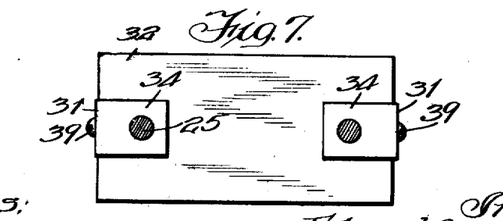
Figure 7 is a view of the upper compression block and the contacts as taken on the line 7—7 of Figure 5.
Figure 8:
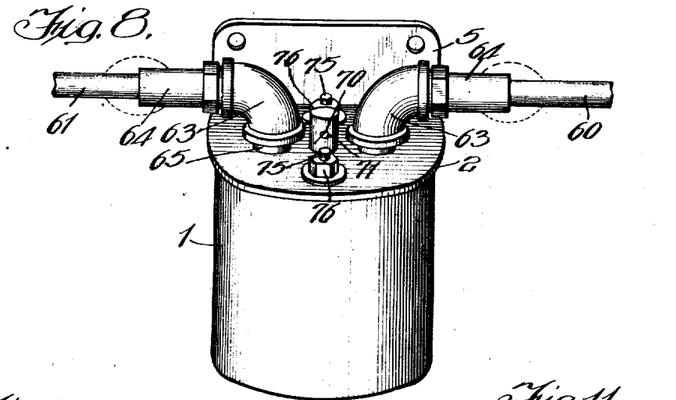
Figure 8 is an isometric view of a modified form employing lead covered cables running to the contacts, this form being particularly useful for what is termed subway work; that is in manholes and underground construction where moisture is encountered in considerable degree.

A block of insulation which is made of a composition board comprising asbestos and cement boiled in mineral oil (transformer oil) is secured to the bottom of the cover 2 as by means of the screws 15 shown in Figure 2. This block 16 is provided with two holes 17—17 which fit over the ends of the insulators 4, these ends extending toward the inside of the tank 1. The insulated conductors 6 which are cemented within the porcelain insulators 4 have stationary contacts 18 mounted upon their inner ends for engagement with the contacts 19 of the upper fuse block 20. The contacts 18 are soldered to the ends of the conductors 6 as by means of suitable sockets 21 and the ends of the conductors and the contacts are held in place as by means of the cement or compound 22. The contacts 19 are mounted upon the upper compression block 20, these contacts being formed of pins of brass or other metal, having the shoulders at 23 engaging the upper surface of the block 20. At the opposite end these pins 24 are threaded on a reduced diameter as shown at 25. The threaded reduced ends 25 are engaged by suitable cylindrical nuts 26 having the flat heads 27 provided with screw driver slots 28. The inner ends of the tubular nuts 26 are cut off square as shown at 30 in Figures 1 and 5 to engage the brass or copper strap 31, which is passed around the end of the lower compression block 32 for the dual purpose of making good contact with the fusible link 33 on the one leg 34, and for retaining the cylindrical nut 26 from disengagement with the block 32 on the other leg 35, as is clearly shown in Figure 5. The outer leg 35 is slotted as shown at 36 so that the reduced portion of the tubular nut 26 may be gripped in said slot, the shoulder portion 37 of the tubular nut 26 preventing the escape of the nut from the slot. The straps 31 are held in place on the ends of the lower compression block 32 by means of small wood screws 39 as shown in Figures 4, 5 and 7. The shoulders 37 on the tubular nut 26 engage the walls of the slot 36 when the nut is loosened from the reduced threaded portion 25 of the pins 24 so that the tubular nuts cannot be lost from the block 32.

The compression blocks are not in this particular embodiment gripped by the heads of the nuts 26 as a small space illustrated at 40 in Figure 5 is left between the head 27 of the nut and the adjacent side 35 of the strap 31. However, the head 27 limits the outward movement of the block 32 so that only a predetermined amount of movement of the block is possible when the fuse 33 blows.

Figures 9, 10, 11, 12, 13, 14:
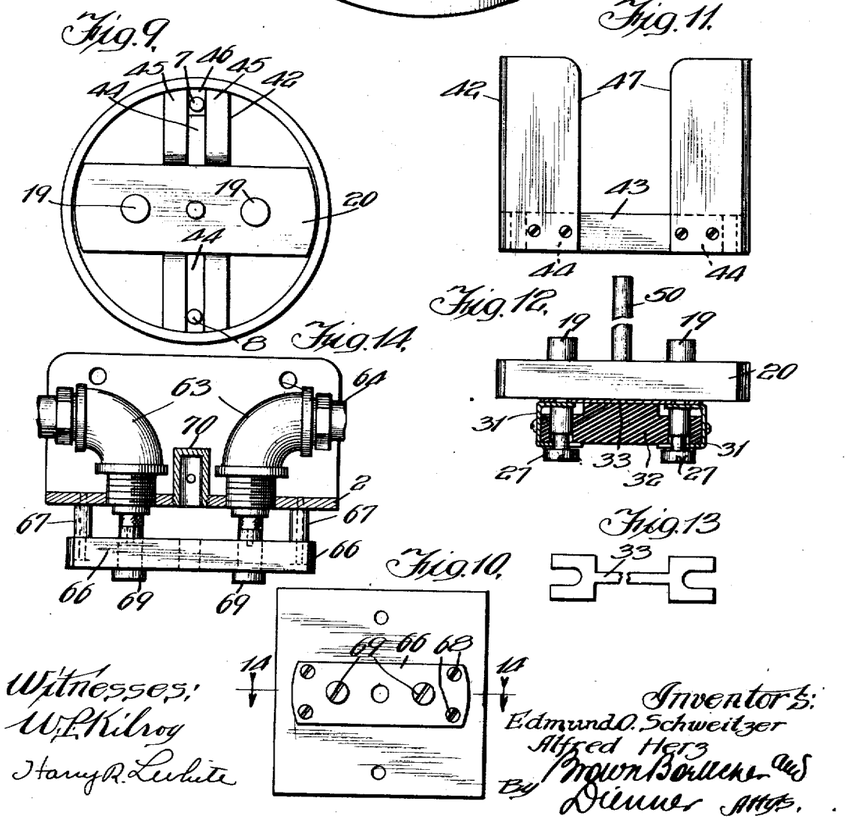
Figure 9 is a view looking down into the container showing the compression blocks in place in the cradle which supports the compression blocks and contacts.
Figure 10 is a bottom plan view of the cover and the stationary contacts connected thereto.
Figure 11 is a side elevational view of the cradles or supports.
Figure 12 is a side elevation of the compression blocks and contacts.
Figure 13 is a plan view of the fusible link.
Figure 14 is a sectional view thru the cover on the line 14—14 of Figure 10.

The compression blocks 32 and 20 are held against the fuse 33 by the mounting in which they are normally supported. This mounting consists of a U-shaped cradle 42 shown more clearly in Figure 11. This cradle, which may be made of wood, comprises a bottom block or member 43 which has its outer ends reduced as shown at 44 in Figure 9. The vertical side pieces 45 are fastened on the sides of the reduced portions 44 to form the legs of the U. The reduced ends 44 stop short of the full width of the vertical pieces 45, leaving small passageways 46 large enough to embrace the bolts 7 and 8. The inner edges 47 are spaced apart far enough to form guides for the compression blocks 20 and 32 as can be clearly seen in Figures 2 and 9. The rods or bolts 7 and 8 pass up between the vertical legs of the U-shaped cradle, these bolts or rods forming guides for the cradle. Springs 48, which surround the lower ends of the rods 7 and 8, tend to raise the cradle 42, this tendency being employed to hold the compression blocks against the fuse and to hold the contacts 18 against the contacts 19 when the parts are in their normal position as indicated in Figures 1 and 2. Suitable washers may be mounted about the rods 7 and 8 to provide a good seating for the cradle 42 upon the springs 48. It is to be noted that the cradle 42, in addition to holding the compression blocks properly in place, also serves as a guide for relatively guiding the raising of the tank 1 over the insulating block 16 so that the contacts 18 are guided properly into alignment with the contacts 19. As previously explained in connection with Figure 5, the cylindrical nuts 26 need not clamp the compression blocks 20 and 32 against each other as this function may be performed solely by the springs 48, the heads 27 of the nuts 26 serving merely to limit the outward movement of the lower compression block 32 with respect to the upper one. The inner ends of the straps 31 have sufficient resiliency to permit this slight relative movement between the compression blocks.

As above stated, it is desirable to be able to put the fusible link in place without actually connecting it to the terminals of the line so that the cover 2 may be securely fastened in place before the fuse is actually connected to the line, so that in case of a short circuit on the line a full arc extinguishing action of the liquid within the container 1 may be effective. To this end we provide a stem 50 of insulating material, which stem is secured to the upper compression block 20 and is adapted to pass upward thru a recess in the insulating block 16 into a recess 51 in the cover plate 2. This recess is formed in a boss between the two bosses 3 and has small holes 52 formed in the side walls so that a pin or wire 53 as indicated in dotted lines in Figure 2 may be passed thru the holes 52 when it is desired to hold the contacts 18 and 19 separated in assembling the cover 2 and tank 1. The arrangement is such that when the stem 50 is blocked from passing upward into the top of the recess 51 by the insertion of the pin or wire 53 in the holes 52 the contacts 18 and 19 will be held separated so that there will be no possible engagement therebetween. Thus the cover may be put in place while the stem 50 is held downwardly by the pin 53, this pin serving to keep the contacts 18 and 19 out of engagement with each other until said pin 53 is withdrawn. When this pin 53 is withdrawn the springs 48 immediately throw the two compression blocks with their contacts 19 upward, these contacts then being brought into butt engagement with the contacts 18. The result of this is that the cover may be securely fastened in place before the fuse is actually connected to the line wires.

Figures 8 to 14 inclusive illustrate a modified form of the invention particularly adapted for underground work where moisture is prevalent. The conductors leading into the cutout in this case are lead covered cables 60 and 61 and they are introduced thru pipe elbows 63 which are connected by suitable nipples 65 with the cover plate 2, and which are provided with the wiping sleeves 64 for making a tight joint with the sheath of the cables 60 and 61. A block of insulation 66 is secured to the lower side of the cover plate 2 by means of the fillers or posts 67 and the screws 68 passing therethru. This block of insulation supports two stationary contacts 69 which contacts are connected to the conductors in the cables 60 and 61 as by soldering or in any other preferred manner. The contacts 69 are adapted to engage the relatively movable contacts 19 on the upper compression block 20. In the present instance the cover plate 2 with its upwardly extending fastening bracket 5 is made of a plate of wrought metal which insures light weight and sufficient strength. To provide for the closing of the contacts 19 and 69 after the cover is in place, we have threaded the small hollow cap 70 thru the top plate, this hollow cap permitting the end of the stem 50 to project into the same when the contacts 19 and 69 are in engagement. A small opening 71, which corresponds to the openings 52 in the form shown in Figures 1 and 2, permits the insertion of a pin, nail, wire, or the like for preventing the rising of the stem when the cover is first put in place in order that the cover may be fastened on the tank without permitting the contacts 19 and 69 to come into engagement. After the cover is fastened in place the wire, nail, pin or other holding means may be withdrawn, permitting the stem 50 to rise and the contacts 19 to engage the contacts 69.

Figure 15:
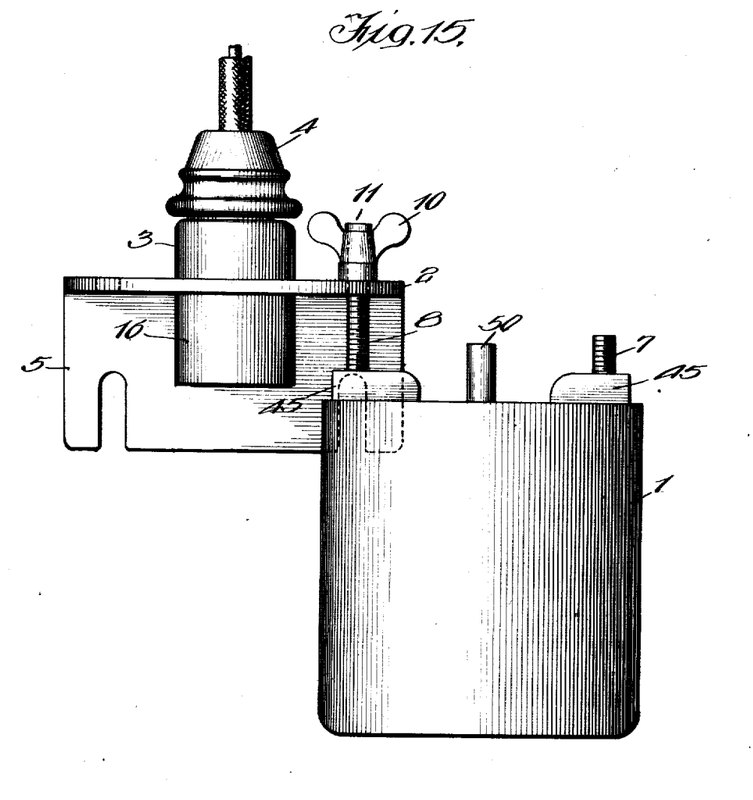
Figure 15 is an elevational view showing the tank as let down and swung out from under the cover.
Figures 16, 19:
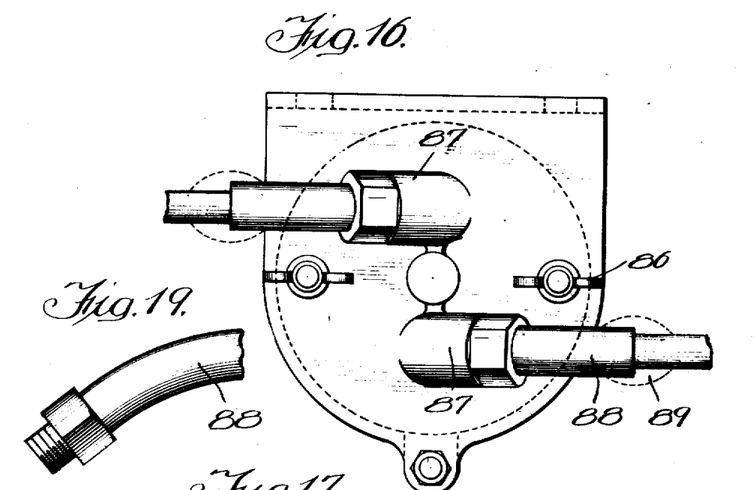
Figure 16 is a plan view of a further modification.
Figure 19 is a side elevational view of one of the soldering nipples.

The operation of the device is as follows. Assuming that the tank 1 is in the lowered position as shown in Figure 15 and is depending from the longer rod 8, the springs 48 will have raised the cradle 42 so that the arms 45 project above the top of the tank 1. It is to be understood that the arms 45 may be cut off so that they will be just level with the top of the tank 1 when the springs have moved the cradle to its uppermost position. The tank is then filled with a suitable insulating oil, preferably, a light mineral oil known as transformer oil, and the compression blocks 20 and 32 with the fuse 33 in place are then set in the cradle 42 by means of the stem 50, which stem projects upwardly above the top of the tank 1. The tank 1, with the liquid therein and the parts in place is then swung about the longer rod 8 into such a position where the insulating block 16 will just pass between the legs 45 of the U-shaped cradle, the stem 50 being depressed to enable it to clear the block 16, and then the tank 1 is raised into position and fastened by the wing nuts 9 and 10 on the bolts 7 and 8. The pin or wire 53 is fastened in place by being inserted in the holes 52 before the tank is raised, so that the stem 50 will encounter the pin 53 and prevent the contacts 19 from rising into engagement with the contacts 17 as the tank is secured to the cover. After the tank and cover are thus secured together, the pin 53 is withdrawn so that the springs 48 move the compression blocks upward, bringing the contacts 19 against the contacts 18 in end to end relation. In this manner it is possible to close the tank before connecting the fuse wire across the line so that if the line is still under short circuit, blowing of the fuse will be taken care of by the device to prevent the establishment of an arc and also to prevent scattering of the oil or destruction of the cutout. Thus it is possible to secure the full effect of the arc extinguishing liquid and the compression blocks and the closed container whenever the fuse is subjected to the potential of the line.

The form shown in Figures 8 to 14 is substantially identical with the form shown in Figures 1, 2 and 15 so far as the chief features of construction and operation are concerned. It is to be understood that the bolts 75 are shown as of equal length in the form of Figure 8 so that the tank 1 may be entirely removed by unthreading the nuts 76. However, the manner of supporting the tank 1 as shown in Figures 2 and 15 may be employed in this type of construction with equal advantage. It is to be understood that the conductors of the cables 60 and 61 are suitably sealed in the elbows 63 so that moisture cannot gain access to the insulation of the cables 60 and 61.

Figures 17, 18, 20:
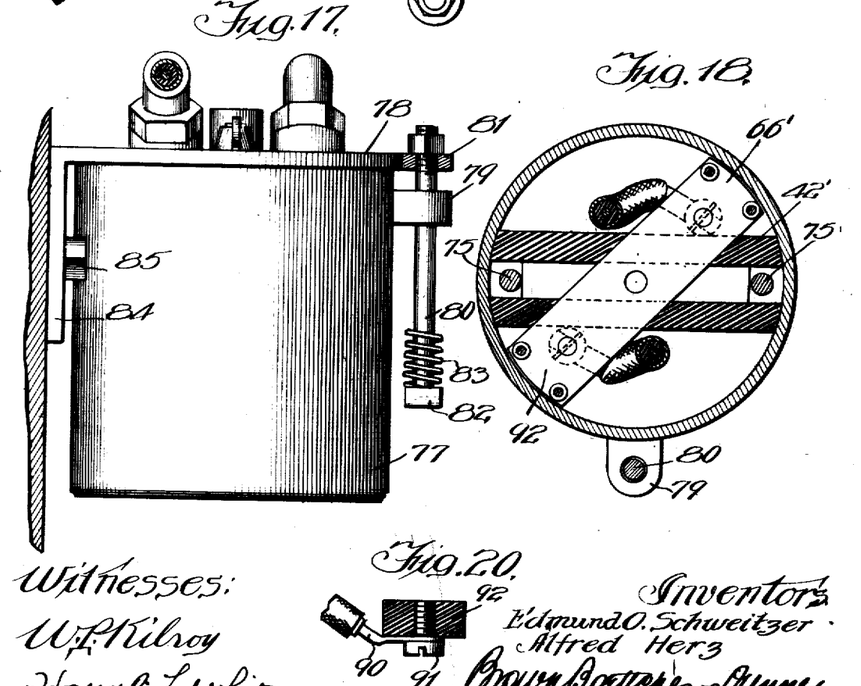
Figure 17 is a side elevational view of the same.
Figure 18 is a horizontal sectional view taken just below the cover of Figure 17.
Figure 20 is a fragmentary sectional view thru the terminal block showing the manner of attaching the conductors to the stationary contacts.

In Figures 16 to 20 we have shown a modification also suitable for subway work. The tank 77 is formed with a lug 79 which embraces a bolt 80 loosely. The bolt 80 is attached at its upper end as shown in Figure 17 to a lug 81 formed integral with the cover 78. The lower end of the bolt 80 has a head 82 above which is held a helical spring 83 for yieldingly supporting the lug 79 and the tank 77. The rear of the cover 78 is formed as a depending plate 84 with suitable slots so that the plate may be slipped over suitable suspension bolts 85 which may be previously put in place. When the wing nuts 86 are unscrewed from the bolts 75 the tank 1 may be dropped down on the guiding bolt 80. The spring 83 prevents an unpleasant jar. The tank may be swung about the bolt 80 in either direction.

In order to permit of a more gradual bend or longer radius of bend being employed for the lead covered cable we lead the same thru the top 78 thru the inclined bosses 87. Suitable soldering or wiping nipples 88 are threaded into the bosses 87, these nipples being curved as shown on a long radius. Wiped joints between the nipples and the lead sheath may be made as shown at 89 in dotted lines. The inner ends of the conductors are provided with lugs or clips 90 which are held under the heads of the screws 91 on the board or block 92, which corresponds to the block 66 shown in the previous modification. The board 92 is arranged diagonally of the cradle 42 to give more room for the introduction of the conductors. This form of device operates substantially as previously described.

The construction of the compression blocks is of importance. These compression blocks are formed of pieces of asbestos and cement board boiled in transformer oil until the oil has penetrated all parts of the block. The pieces which we employ are about one inch by two inches in cross section and boiling of the same for half an hour appears to accomplish thoro impregnation. The resulting product is a great improvement upon insulating materials employed for this class of service heretofore. Apparently the treatment of boiling in transformer oil removes some of the objectionable minerals which are contained within the asbestos and at the same time all of the moisture contained within the fibers of the asbestos is removed. These blocks are highly resistant to the action of heat and do not crack under uneven heating, as some of the substances which we have previously employed. The untreated board is of a hygroscopic character, and some times contains a large moisture content, but the treatment of boiling in the transformer oil drives off all moisture and removes completely the tendency to absorb moisture.

The cradle 42 is made preferably of wood, although any other suitable insulating material may be employed. The blocks of insulation 16 and 66 may be made of wood treated with transformer oil or of asbestos board boiled in transformer oil as above indicated.

The pressures generated within the closed container rise to a high value. The effect is beneficial in extinguishing the arc of the blowing fuse. The cover fits tightly on top of the tank and the stem 50 seals the openings 52 so that the sudden rise of pressure finds no easy outlet and even under severe short circuit the only external effect that is visible is a fine spray of oil discharged from the joint between the cover and the tank.

We do not intend to be limited to the precise details of construction shown and described, except as defined in the appended claims.

We claim:

1. In combination, a tank, a cover for the tank, means for holding the cover on the tank, a pair of contacts mounted on the under side of the cover, a pair of terminals mechanically independent of said contacts, a fuse between said terminals, means for supporting the fuse and the terminals and yielding means for holding the terminals in electrical connection with the contacts.

2. In combination, a tank, a cover for the tank, a pair of conductors passing thru said cover, said passage being sealed against moisture, a first pair of terminals mounted in insulated relation on the cover, a second pair of co-operating terminals, a support for said co-operating terminals, said co-operating terminals being insulated from each other, a fuse link connecting the co-operating terminals and spring means below said supports for pressing the second pair of terminals into engagement with the first pair of terminals.

3. In combination, a tank, a cover for the tank, conductors passing thru the cover and having contacts within the tank, a pair of compression blocks, a fuse between the blocks, a cradle support for said blocks, a spring below the cradle and means connected to the terminals of the fuse and co-operating with said contacts to place the fuse in series relation with said conductors, said means being mounted on one of said pair of compression blocks.

4. In combination, a tank, a cover for the tank, a pair of bolts for holding the cover on the tank, an insulating support guided on said bolts, spring means guided on said bolts for the support, said support having a transverse recess, a pair of compression blocks guided in the support and a fuse between the blocks, said fuse having conducting means leading to the cover.

5. In combination, a supporting block, yielding means for supporting the block, a fuse mounting carrying a fuse and a pair of contact terminals, a second supporting block having a pair of co-operating contacts and conductors connected to said co-operating contacts.

6. In combination, a tank, a supporting block in the tank, spring means between the tank and the block, guiding means for the block, a cover also guided by said guiding means, contacts mounted on said cover, a fuse mounting having a fuse and contacts, said mounting being held by said supporting block with its contacts yieldingly in engagement with the contacts on said cover.

7. In combination, a receptacle, a cover for the receptacle, a block of insulation mounted on the lower surface of the cover, stationary contacts mounted in said block, a movable block of insulation below said first block, said movable block having terminals co-operating with the first terminals, a fuse connecting said second terminal and yielding means for the second block for forcing the contacts of the second block into engagement with the contacts of the first block.

8. In combination, a tank, a cover for the tank, a relatively stationary block secured to the bottom of the cover, a pair of relatively stationary contacts mounted in said block, conductors passing thru said cover and connected to said stationary contacts, a movable block having contacts secured thereto, a fuse connected between said latter contacts, said stationary contacts and said latter contacts having flat faces for making butt contact and a spring for the movable block for forcing the contacts into engagement.

9. In combination, a tank having a cover, a pair of relatively stationary contacts and a pair of relatively movable contacts, said contacts having flat faces for making butt contact, a fusible link between one pair of contacts, conductors connected to the other pair of contacts, said conductors passing thru said cover and spring means for holding the pairs of contacts in butt engagement.

10. In combination, a receptacle, a cover for the receptacle, a pair of stationary contacts mounted in insulated relation on said cover, conductors connected to said stationary contacts, a movable block of insulation having movable contacts for engagement with said stationary contacts, a fusible link connecting said movable contacts, a spring for forcing the movable contacts into engagement with the relatively stationary contacts, and means for holding said contacts out of engagement while the cover is being secured to the receptacle.

11. In combination, a tank, a cover for the tank, a pair of butt contacts mounted in insulated relation on said cover, means for securing the cover upon the tank, an insulated fuse mounting having a pair of butt contacts adapted to engage the butt contacts on the cover, and means guided on the securing means for yieldingly holding the said pairs of butt contacts in engagement with each other.

12. In combination, a tank, a cover for the tank, a pair of butt contacts mounted in insulated relation on said cover, means for securing the cover upon the tank, an insulated fuse mounting having a pair of butt contacts adapted to engage the butt contacts on the cover, means guided on the securing means for yieldingly holding the said pairs of butt contacts in engagement with each other, and means controllable externally of the tank for holding the said pairs of contacts apart while said cover is being secured over the top of the tank.

13. In combination, a tank, a cover for the tank, a pair of relatively movable butt contacts within the tank, a pair of relatively stationary butt contacts secured on the bottom of the cover, a plurality of bolts for securing the cover on the tank, one of said bolts being longer than the others and serving as a pivot for swinging the tank sidewise to expose said contacts.

14. In combination, a tank, a cover plate for the tank, said plate having a bracket extending from one edge thereof for mounting the tank, a pair of rods for clamping the tank and the cover together, contact means mounted on the bottom side of the cover, and contact means mounted within the tank, a fuse connecting the contacts within the tank, and conductors mounted in insulated relation on the cover and connected to the contacts on the bottom of the cover, one of said rods being longer than the other and being adapted to form a pivot for swinging motion of the tank from under the cover.

15. In combination, a receptacle, a cover for the receptacle, a pair of stationary contacts mounted in insulated relation on the lower side of the cover, a pair of movable contacts mounted within the tank and guided into engagement with the stationary contacts, a fusible link connecting said movable contacts, spring means tending to force the movable contacts into engagement with the stationary contacts, a recess in said cover, a stem connected to said movable contacts and adapted to project into said recess, and means removable externally from the receptacle and projecting into said recess for preventing the rising of the relatively movable contacts into engagement with the stationary contacts when the cover is secured to the receptacle.

16. In combination, a receptacle, a cover for the receptacle, a pair of stationary contacts mounted on the lower side of the cover, a pair of movable contacts mounted within the receptacle, spring means tending to move the movable contacts upward into engagement with the stationary contacts when the cover is in place, a stem secured to said movable contacts, said cover having a recess therein adapted to receive the end of the stem, and means projecting into the recess for preventing the rising of the stem while the cover is being secured in place, said means being removable from the recess after the cover is secured in place.

17. In combination, a pair of compression blocks, one of said blocks having a pair of threaded studs projecting therefrom, tubular nuts threaded on said studs, said nuts having enlarged heads and having reduced portions immediately under the heads, and metal straps secured at each end of said block, said straps having slots to receive the reduced end of said tubular nuts.

18. In combination, a pair of compression blocks adapted to grip a fuse between them, a pair of metallic pins extending thru one of the blocks, said pins having butt contacts at their outer ends, cylindrical members threaded to said pins, said cylindrical members having heads and reduced portions under the heads, and metallic straps having slots to receive the reduced portions, said straps being secured on the ends of the second block.

19. In combination, a casing having circuit terminals, a cover for said casing, yielding means for holding said terminals in circuit closed relation, and means controllable externally of the casing for holding the circuit terminals in open circuit relation while said cover is being arranged upon the casing, said last means comprising a stop removable to permit closing of the circuit by said yielding means.

20. In combination, a casing having circuit terminals, means depressible to hold the circuit between said terminals open, said depressible means being projectible to permit closing of the circuit between said terminals and a stop for holding said first means against projection, said stop being removable to permit projection of said means to close the circuit.

21. In combination, a tank, a cover for said tank, relatively movable and stationary contacts within the tank, and means connecting the tank and cover for relative longitudinal and pivotal movement.

22. In combination, a tank, a cover for the tank, relatively movable and stationary contacts within the tank, and a rod carried by the tank and connecting the tank and cover, said rod having longitudinal movement relative the cover and permitting relative pivotal movement between the tank and the cover.

In witness whereof we hereunto subscribe our names this 6th day of September, 1919.
EDMUND O. SCHWEITZER.
ALFRED HERZ.